(12) United States Patent
Boulanger et al.

(10) Patent No.: US 8,587,345 B2
(45) Date of Patent: Nov. 19, 2013

(54) DEVICE FOR DETECTING PULSED SIGNALS WITH IMPROVED SENSITIVITY

(75) Inventors: Emilie Boulanger, Saint Berthevin (FR); Frankie Letellier, Laval (FR)

(73) Assignee: Thales, Neuilly sur Seine (FR)

( * ) Notice: Subject to any disclaimer, the term of this patent is extended or adjusted under 35 U.S.C. 154(b) by 227 days.

(21) Appl. No.: 12/978,034

(22) Filed: Dec. 23, 2010

(65) Prior Publication Data

US 2012/0038502 A1 Feb. 16, 2012

(30) Foreign Application Priority Data

Dec. 30, 2009 (FR) ...................................... 09 06396

(51) Int. Cl.
*G01R 29/00* (2006.01)

(52) U.S. Cl.
USPC ............................................................ 327/2

(58) Field of Classification Search
USPC ....................................................... 327/2–12
See application file for complete search history.

(56) References Cited

U.S. PATENT DOCUMENTS

| 5,317,317 A | 5/1994 | Billaud et al. |
| 5,387,915 A | 2/1995 | Moussa et al. |
| 2006/0197700 A1 | 9/2006 | Stevens et al. |
| 2010/0093282 A1* | 4/2010 | Martikkala et al. .......... 455/63.4 |

FOREIGN PATENT DOCUMENTS

| EP | 0 434 355 A2 | 6/1991 |
| EP | 0 560 658 A1 | 9/1993 |

\* cited by examiner

*Primary Examiner* — Timothy A Brainard
(74) *Attorney, Agent, or Firm* — Baker & Hostetler LLP

(57) ABSTRACT

A device for detecting non-phase-modulated pulsed signals includes at least one amplifier receiving a radiofrequency signal, and restoring at least one first signal representative of the envelope of the input signal, and a second normalized signal, characterized in that a module for estimating the stability of the phase includes means for estimating the phase of the radiofrequency signal, and means for evaluating the temporal stability of the phase, the presence of a characteristic pulse being detected if the phase is stable according to determined criteria.

9 Claims, 3 Drawing Sheets

DEVICE FOR DETECTING PULSED SIGNALS WITH IMPROVED SENSITIVITY

CROSS-REFERENCE TO RELATED APPLICATION

This application claims priority to foreign French patent application No. FR 0906396, filed on Dec. 30, 2009, the disclosure of which is incorporated by reference in its entirety.

FIELD OF THE INVENTION

The present invention relates to a device for detecting pulsed signals with improved sensitivity. It can be applied more particularly to the field of secondary radar systems, notably used in systems for detecting and identifying aircraft, and more precisely detection chains used in these systems. More generally, the present invention is applied to chains for receiving pulsed signals or sequences of non-phase-modulated pulses.

BACKGROUND

Secondary radars, commonly designated by the initials SSR corresponding to the conventional terminology of "Secondary Surveillance Radar", are widely used in the field of the detection of aerial targets. Secondary radars are typically fitted to fixed terrestrial platforms, and are often coupled with primary radars. Secondary radars can also be fitted to mobile terrestrial or aerial platforms. Secondary radars can also be designated according to the initials IFF, corresponding to the conventional terminology of "Identification Friend or Foe". IFF, initially designed for discriminating between friendly or enemy targets, has subsequently branched into a plurality of modes, used notably in civil aeronautics, for detecting aircraft fitted with transponders. The transponders fitted to the aircraft emit signals in a spontaneous manner on a periodic basis, or in response to specific interrogation signals emitted by secondary radars or interrogators. The secondary radars or interrogators pick up the signals emitted by the transponders. A specific feature of the signals emitted by the transponders, termed SIF according to the acronym corresponding to the conventional terminology "Selective Identification Feature", is that the latter take the form of non-phase-modulated pulse trains. A certain number of pulses are emitted, customarily delimited by two so-called "bracketing" pulses provided for this purpose, and commonly referred to simply as "brackets": the absence or the presence of pulses in messages of determined duration constitutes a logical word containing certain indications specific to the aircraft, such as its identification, its altitude, etc. For example, it is possible to cite the A mode, in which the transponder of an aircraft transmits an SSR identification code, the code making it possible notably to associate, in a radar tracking system, the identification of an aircraft with a radar blip. It is also possible to cite the C mode, in which an altitude indication is added, the indication being able to for example be displayed on a control screen of an air traffic control centre, in association with the radar blip corresponding to the aircraft. In most modes considered, a transponder emits a message consisting of a sequence defined by a plurality of pulses, the pulses being emitted at an unmodulated characteristic frequency. The secondary radar detection chain then operates a decoding of the words reaching it in this form, by detecting the absence or the presence of the pulses lying between the pulses of "brackets" type, delimiting the words.

However, detection can sometimes be tricky, notably when the targets are distant and/or the signal is strongly disturbed by noise. In such cases, the signal-to-noise ratio may be very low, and require a very low detection sensitivity, thus necessitating the implementation of refined means with the aim of allowing detection of targets satisfying the regulatory constraints. Furthermore, the diversity of the targets, a greater or lesser distance from the secondary radar, requires the detection chains to cover a wide input dynamic, typically from −22 dBm to −84 dBm.

Among the technical solutions known from the prior art, a particularly advantageous technique consists in using a logarithmic amplifier, capable of covering a wide input dynamic, and of utilizing an output of the logarithmic amplifier, termed the RSSI output or "video" output, the initials RSSI standing for the expression "Received Signal Strength Intensity" (i.e. intensity of the power of the received signal). The RSSI output thus restores a signal of envelope type, representative of the reception level. The RSSI output of the logarithmic amplifier is then linked to a high-resolution analogue-digital converter for digital processing of the data.

SUMMARY OF THE INVENTION

The present invention alleviates at least the aforementioned drawbacks, by providing a device for detecting pulsed signals with improved sensitivity, making it possible to detect pulsed signals exhibiting low signal-to-noise ratios.

An advantage of the invention is that it may be easily implemented in already known devices for detecting pulsed signals.

Another advantage of the invention is that since the invention pertains to unmodulated signals, it is possible to decrease the passband of the signal specifically for the processing implemented by the device forming the subject of the invention.

For this purpose, the subject of the invention is a device for secondary radar for detecting non-phase-modulated pulsed signals or sequences of pulses of a determined frequency, comprising at least one amplifier receiving a radiofrequency signal, and restoring at least one first signal representative of the envelope of the input signal, and a second normalized signal, wherein a module for estimating the stability of the phase comprises means for estimating the phase of the radiofrequency signal measuring the phase of the said second normalized signal, means for evaluating the temporal stability of the phase, the presence of a characteristic pulse being detected if the phase is stable according to determined criteria.

In one embodiment of the invention, the amplifier can be a logarithmic amplifier.

In one embodiment of the invention, the means for estimating the phase of the radiofrequency signal can be implemented by a preprocessing module transposing the normalized signal into baseband, a demodulator decomposing the normalized signal into in-phase and quadrature components, the components being filtered by low-pass filters of cutoff frequencies greater than the determined frequency of the sequences of pulses, a phase estimation module then determining the value of the phase of the radiofrequency signal equal to the arc-tangent of the ratio of the quadrature and in-phase components arctan(Q/I), an analysis module evaluating the stability of the phase for a time window of determined duration.

In one embodiment of the invention, the preprocessing module, demodulator, low-pass filters, phase estimation module and analysis module can carry out digital processings, after conversion of the analogue signals by an analogue—digital converter.

In one embodiment of the invention, the analysis module can evaluate the stability of the phase, by counting the number H of samples, from among a plurality of samples of the phase signal upstream of a sample at an instant $t_n$ of phase $\phi_n$, whose phase $\phi_k$ lies in a reference template defined by a determined threshold value $\xi$ around the phase $\phi_0$.

In one embodiment of the invention, the device for detecting signals can comprise a detection module carrying out the detection of characteristic pulses on the basis of the first signal restored by the amplifier, and the module for estimating the phase can confirm the presence of a pulse detected by the detection module if the phase is stable, or denies the presence of a detected pulse otherwise.

BRIEF DESCRIPTION OF THE DRAWINGS

Other characteristics and advantages of the invention will become apparent on reading the description, given by way of example, offered with regard to the appended drawings which represent.

DETAILED DESCRIPTION

Figure 1:
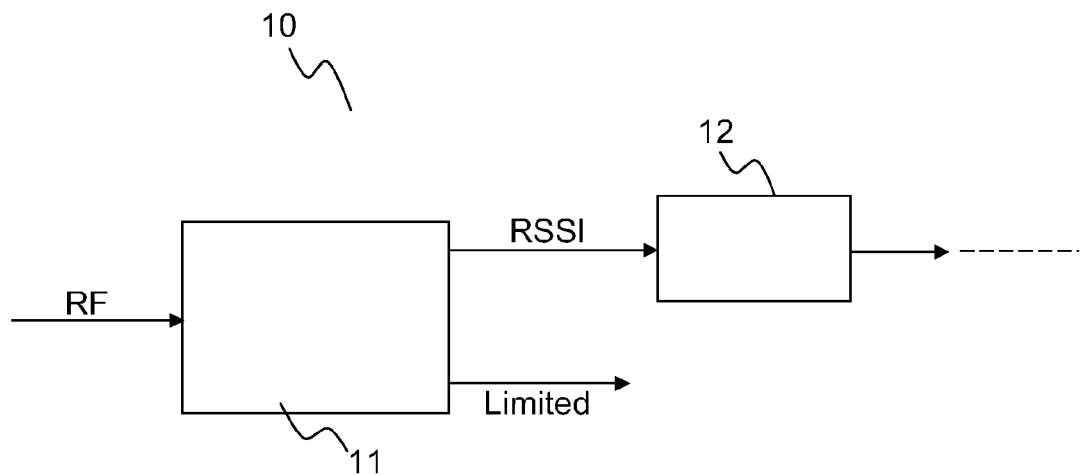
FIG. 1, the basic diagram of a chain for detecting pulsed signals known to the prior art.

FIG. 1 presents the basic diagram of a chain for detecting pulsed signals known from the prior art.

A detection chain 10 for detecting non-phase-modulated pulsed signals can notably comprise an amplifier 11 receiving a radiofrequency signal as input, and restoring a signal of RSSI type representative of the intensity of the signal received. A pulse detection module 12 receives the signal of RSSI type as input. The detection module can comprise filtering blocks and an analysis block, operating for example directly on analogue signals, or else implemented in a digital circuit after conversion of the analogue signals to be processed by an analogue-digital converter.

In a typical manner which is in itself known from the prior art, the amplifier 11 may be an amplifier of logarithmic type. Logarithmic amplifiers are for example available commercially in the form of so-called COTS standard electronic hardware items, the initials standing for the expression "Commercial Off The Shelf". The amplifier 11 can also be implemented in the form of an integrated circuit, just like the various elements of the detection chain 10. Logarithmic amplifiers usually comprise an output of RSSI type, as well as an output of the type commonly termed "limited", restoring a normalized signal, that is to say one whose amplitude is independent of the power of the signal input to the receiver. The normalized output is customarily used when the amplifier is integrated into a chain for detecting phase-modulated signals. The normalized output is on the other hand unutilized when the logarithmic amplifier is used in a chain for detecting non-phase-modulated pulsed signals.

The principle of the present invention relies on the utilization of the signal restored by the normalized output of an amplifier of logarithmic type, so as to extract therefrom indications regarding the phase of the input signal, for example with respect to a periodic reference signal. The phase indication is then analysed so as to detect the presence of pulses in the input signal, or else to deny or confirm the presence of a pulse diagnosed by the pulse detection module 12, relying in a manner which is in itself known on the analysis of the power of the input signal.

Figure 2:
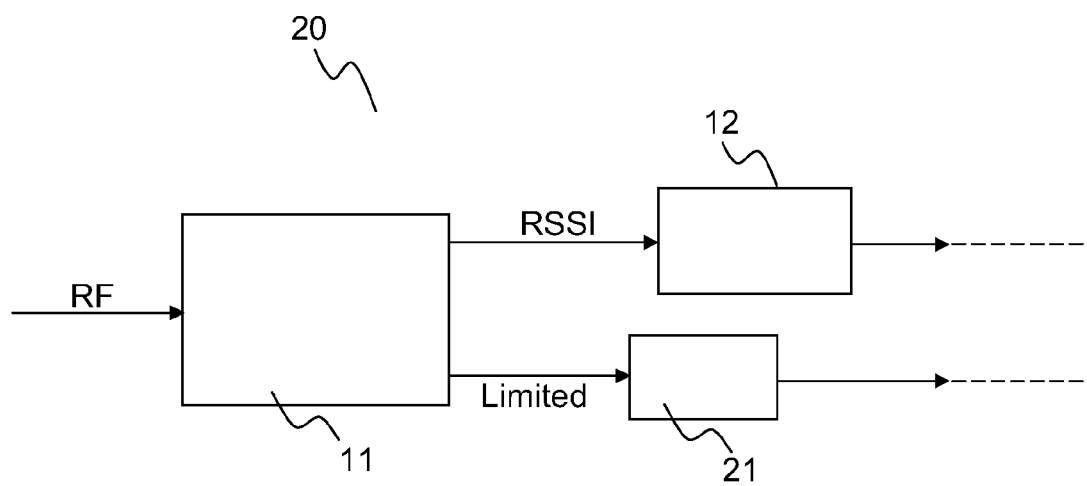
FIG. 2, the basic diagram of a chain for detecting pulsed signals according to an embodiment of the present invention.

FIG. 2 presents the basic diagram of a chain for detecting pulsed signals according to an embodiment of the present invention.

A chain for detecting pulsed signals 20 comprises for example, in a manner similar to the known detection chain described hereinabove with reference to FIG. 1, an amplifier 11 fed with the input radiofrequency signal, a pulse detection module 12 utilizing the RSSI output of the amplifier 11, of logarithmic amplifier type in the example illustrated by the figure. In the exemplary embodiment of the invention, the normalized output of the amplifier 11 is converted by an analogue-digital converter 21; of course, it is also possible not to resort to a converter, and to operate analogue processing directly on the analogue signal. Digital processing presents notably the advantage of exhibiting lower development and fine-tuning costs. The processing can for example be implemented in hardware items with a fast operating frequency, for example in programmable logic hardware, commonly denoted by the term FPGA standing for the expression "Field Programmable Gate Array", or else in dedicated logic circuits commonly denoted by the term ASIC. Advantageously, it is possible to employ an extra filter, for example a digital filter downstream of the digital-analogue converter. This digital filter makes it possible to decrease the width of the passband, required notably to ensure the detection of the rising edges of the pulses.

The present invention proposes to utilize the signal of the normalized output of the amplifier 11, so as to extract therefrom an indication as regards the phase of the input signal. Indeed, as is described in detail hereinafter with reference to FIG. 4, in the presence of noise, notably Gaussian white noise, the signal-to-noise ratio of the signal received may be too low to allow the detection of pulses by analysing the RSSI output of the amplifier. On the other hand, the phase of the input signal, for example with respect to a periodic reference signal, is little affected overall by the noise. In this way, a signal representative of the phase of the input signal exhibits, when only noise is present, great variability, between 0 and $2\pi$; on the other hand, in the presence of a pulse, the signal representative of the phase of the input signal exhibits lower variability, around a random phase $\phi_0$ lying between 0 and $2\pi$. Thus, assessment of the stability of the signal representative of the phase allows the detection of pulses.

Figure 3:
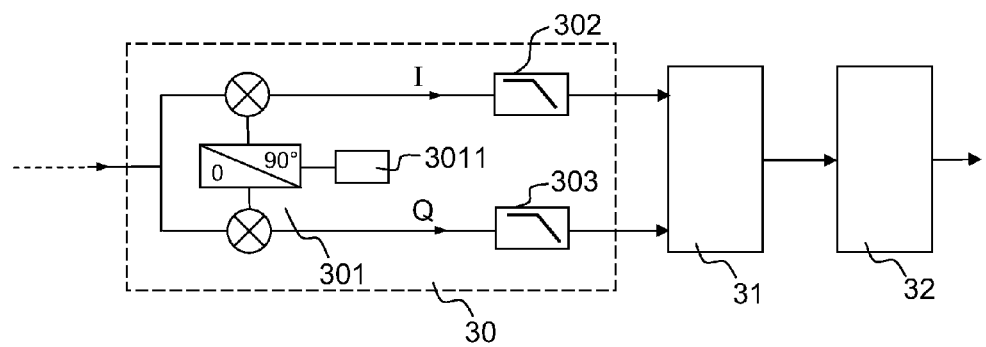
FIG. 3, the basic diagram of a processing chain associated with a device for detecting pulsed signals, according to one embodiment of the invention.

FIG. 3 presents the basic diagram of a processing chain associated with a device for detecting pulsed signals, according to one embodiment of the invention.

The signal arising from the normalized output of the amplifier 11, with reference to FIGS. 1 and 2, after possible conversion by the analogue-digital converter 21, can be fed to the input of a preprocessing module 30, followed by a phase estimation module 31, followed by an analysis module 32.

The phase estimation module 31 makes it possible to restore an indication regarding the phase of the signal arising from the normalized output of the amplifier, with respect to a reference signal. In the example illustrated by the figure, the preprocessing module 30 allows the transposition into baseband of the signal arising from the normalized output of the amplifier, by a decomposition into in-phase (I) and quadrature (Q) components, via an I/Q demodulator 301. The I/Q demodulator 301 can notably comprise, in a manner also in itself known, a local oscillator 3011 delivering a periodic reference signal. Each of the components may then be filtered by a low-pass filter 302, 303. The low-pass filters 302, 303 make it possible to preserve just the frequencies corresponding to the expected useful signals. For example, the frequency of emission by the transponders operating in one of the aforementioned modes is typically 1090 MHz. It is thus for example possible to design the low-pass filters 302, 303 in such a way that their cutoff frequency is of the order of 2 to 4 MHz. Transposition into baseband makes phase estimation easier. The filtering of the transposed signal by the low-pass filters 302, 303 also has the effect of allowing the rejection of the image spectral lines arising from the I/Q transposition.

In the example illustrated by FIG. 3, the phase estimation module 31 can for example implement a calculation of the arc-tangent of the ratio of the quadrature and in-phase components: arctan(Q/I).

Other known procedures for estimating the phase can of course also be implemented in a device according to the present invention. It is for example possible to cite the use of a delay line allowing the calculation of the scalar product of two samples of signals A and B spaced slightly apart, or else the implementation of a so-called Cordic algorithm.

Figure 4:
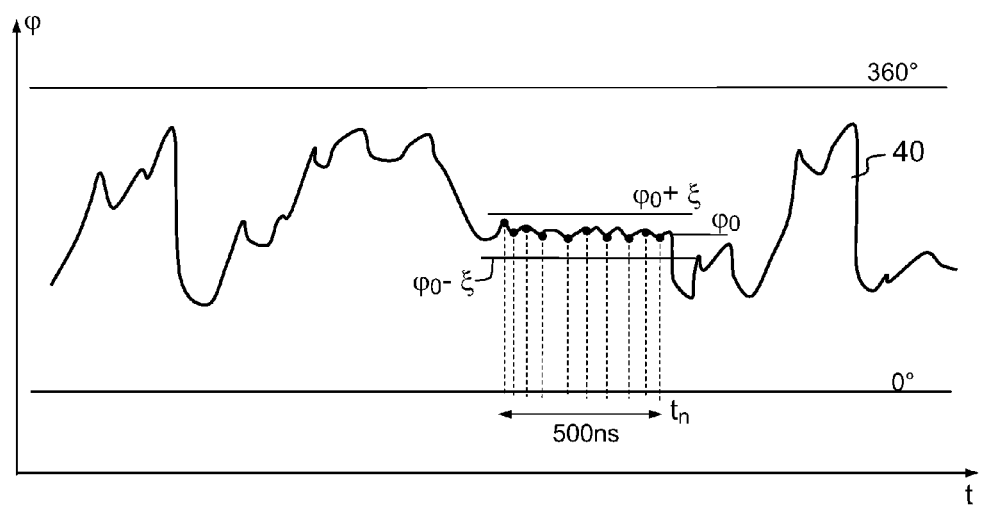
FIG. 4, a curve illustrating the temporal evolution of a signal representative of the phase of the signal received by a detection device, according to one embodiment of the invention.

FIG. 4 presents a curve illustrating the temporal evolution of a signal representative of the phase of the signal received by a detection device, according to one embodiment of the invention.

An exemplary temporal variation of a signal representative of the phase of the input signal with respect to a reference signal is illustrated by a curve 40. In the presence of background noise, the phase varies in a random manner between 0 and $2\pi$. in the presence of a pulse, the phase remains centred on a value $\phi_0$, for a duration corresponding substantially to the duration of a pulse of SIF type, for example 450 ns. The analysis module 32, with reference to FIG. 3, comprises means for assessing the variability of the phase signal, of which an exemplary implementation is described hereinafter. The assessment of the phase variability can consist, in the example where the processing is implemented in the detection chain in a digital manner, in determining via a counter, for a determined number N of phase samples $\phi_k$ upstream of a sample carried out at an instant $t_n$, the number H of them whose phase is greater than $\phi_0+\xi$ or less than $\phi_0-\xi$, $\xi$ being a chosen threshold value. The threshold $\xi$ defines a reference template, illustrated in the figure by a horizontal band of width $2\xi$, covering ten samples spaced 50 ns apart, upstream of the instant $t_n$ corresponding to the sample of phase $\phi_o$. Of course, other procedures for determining the variability of the phase signal may be envisaged, implemented in digital or analogue analysis chains. In a general manner, the analysis module 32 assesses the variations of the phase in a determined time window upstream of a given instant, with respect to a reference template.

Figure 5:
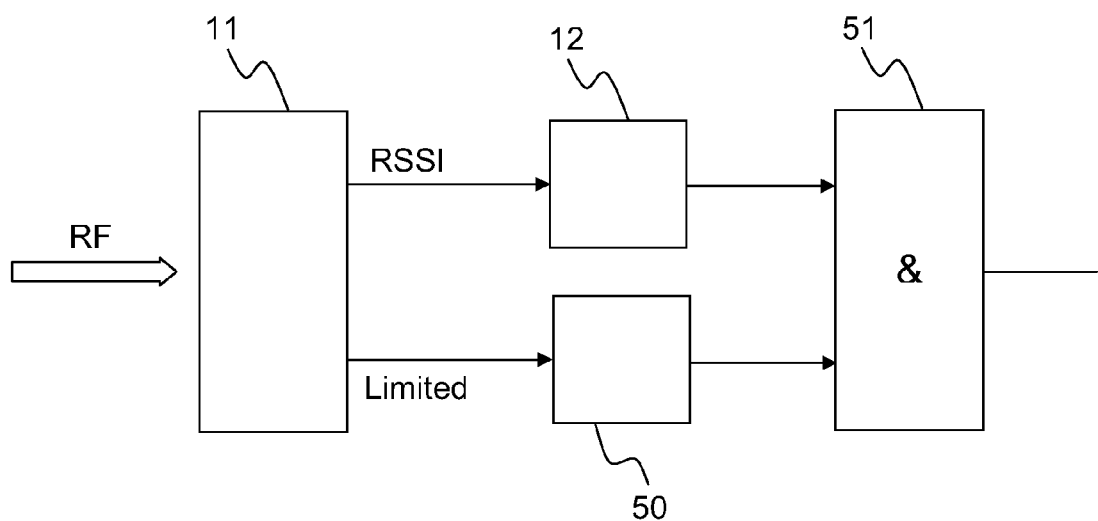
FIG. 5, the overall basic diagram of a device for detecting pulsed signals according to one embodiment of the invention.

FIG. 5 presents the overall basic diagram of a device for detecting pulsed signals according to one embodiment of the invention.

In an exemplary embodiment of the invention, it is possible to utilize the indication relating to the phase of the input signal, so as to confirm or deny the presence of a pulse detected via means in themselves known, on the basis of an analysis of the RSSI signal provided by the amplifier.

In a schematic manner, a detection device can comprise the amplifier 11 receiving a radiofrequency signal as input, the amplifier 11 comprising notably an RSSI output feeding the pulse detection module 12, the pulse detection module 12 being able to diagnose on the basis of the RSSI signal, the presence of a pulse, and to restore a signal representative of the presence or of the absence of a pulse, this signal being for example a signal of Boolean type taking a given logic state in the presence of a pulse. The amplifier 11 also comprises a normalized output feeding a module for estimating the stability of the phase 50, comprising for example the preprocessing module 30, the phase estimation module 31, and the analysis module 32, such as were described previously with reference to FIG. 3. The module for estimating the stability of the phase 50 thus restores in its output, a signal representative of the stability of the phase of the radiofrequency signal, this signal being for example also a signal of Boolean type. The respective outputs of the pulse detection module 12 and of the module for estimating the stability of the phase 50 feed a pulse detection confirmation module 51. For example, in a simple implementation by digital processing, the detection confirmation module 51 carries out an operation of logical "AND" type on the two input signals which in this example are of Boolean type.

The invention claimed is:

1. A device for a secondary radar for detecting non-phase-modulated pulsed signals or sequences of pulses of a determined frequency, comprising:
   at least one amplifier receiving a radio frequency signal and restoring at least one first signal representative of an envelope of the radio frequency signal and a normalized signal;
   a module for estimating a stability of a phase of the radio frequency signal comprising:
      means for estimating the phase of the radio frequency signal and measuring the phase of the normalized signal; and
      means for evaluating a temporal stability of the phase of the radio frequency signal and detecting a presence of a characteristic pulse if the phase of the radio frequency signal is stable according to determined criteria.

2. The device for detecting signals according to claim 1, wherein said at least one amplifier is a logarithmic amplifier.

3. The device for detecting signals according to claim 2, further comprising a detection module carrying out the detection of characteristic pulses on a basis of the at least one first signal restored by the at least one amplifier, wherein the module for estimating the stability of the phase of the radio frequency signal confirms the presence of a pulse detected by the detection module if the phase of the radio frequency signal is stable, or denies the presence of a detected pulse otherwise.

4. The device for detecting signals according to claim 1, wherein the means for estimating the phase of the radio frequency signal are implemented by:
   a preprocessing module transposing the normalized signal into baseband;
   a demodulator decomposing the normalized signal into in-phase and quadrature components, wherein the components being filtered by low-pass filters of cutoff frequencies greater than the determined frequency of the sequences of pulses;
   a phase estimation module determining a value of the phase of the radio frequency signal using an arc-tangent of a ratio of the quadrature and in-phase components (Q/I); and an analysis module evaluating the stability of the phase of the radio frequency signal for a time window of determined duration.

5. The device for detecting signals according to claim 4, further comprising a detection module carrying out the detection of characteristic pulses on a basis of the at least one first signal restored by the at least one amplifier, wherein the module for estimating the phase of the radio frequency signal confirms the presence of a pulse detected by the detection module if the phase of the radio frequency signal is stable, or denies the presence of a detected pulse otherwise.

6. The device for detecting signals according to claim 4, wherein the preprocessing module, the demodulator, the low-pass filters, the phase estimation module and the analysis module carry out digital processings, after conversion of analogue signals by an analogue-digital converter.

7. The device for detecting signals according to claim 6, further comprising a detection module carrying out the detection of characteristic pulses on a basis of the at least one first signal restored by the at least one amplifier, wherein the module for estimating the phase of the radio frequency signal confirms the presence of a pulse detected by the detection module if the phase of the radio frequency signal is stable, or denies the presence of a detected pulse otherwise.

8. The device for detecting signals according to claim 6, wherein the analysis module evaluates the stability of the phase of the radio frequency signal, by counting a number of samples, from among a plurality of samples of a phase signal upstream of a sample at an instant $t_n$ of a phase $\phi_0$, the phase $\phi_0$ being a phase value that the phase of the received radio frequency signal remains centred around, wherein a phase $\phi_k$ corresponding to a $k^{th}$ sample in the number of samples lies in a reference template defined by a determined threshold value around the phase $\phi_0$.

9. The device for detecting signals according to claim 8, further comprising a detection module carrying out the detection of characteristic pulses on a basis of the at least one first signal restored by the at least one amplifier, wherein the module for estimating the phase of the radio frequency signal confirms the presence of a pulse detected by the detection module if the phase of the radio frequency signal is stable, or denies the presence of a detected pulse otherwise.

* * * * *